(12) United States Patent
Wu et al.

(10) Patent No.: US 12,245,062 B2
(45) Date of Patent: Mar. 4, 2025

(54) METHOD FOR LINK QUALITY MONITORING AND RELATED PRODUCTS

(71) Applicant: GUANGDONG OPPO MOBILE TELECOMMUNICATIONS CORP., LTD., Guangdong (CN)

(72) Inventors: Zuomin Wu, Guangdong (CN); Wenqiang Tian, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 316 days.

(21) Appl. No.: 17/736,618

(22) Filed: May 4, 2022

(65) Prior Publication Data

US 2022/0264344 A1    Aug. 18, 2022

Related U.S. Application Data

(63) Continuation of application No. PCT/CN2019/116890, filed on Nov. 8, 2019.

(51) Int. Cl.
| | |
|---|---|
| H04W 24/08 | (2009.01) |
| H04L 5/00 | (2006.01) |
| H04W 56/00 | (2009.01) |
| H04W 74/0816 | (2024.01) |

(52) U.S. Cl.
CPC .......... *H04W 24/08* (2013.01); *H04L 5/0051* (2013.01); *H04W 56/001* (2013.01); *H04W 74/0816* (2013.01)

(58) Field of Classification Search
None
See application file for complete search history.

(56) References Cited

U.S. PATENT DOCUMENTS

| | | | | |
|---|---|---|---|---|
| 11,991,111 | B2* | 5/2024 | Mondal | H04W 72/044 |
| 2019/0260484 | A1 | 8/2019 | Nam et al. | |
| 2020/0252821 | A1* | 8/2020 | Deogun | H04W 76/19 |
| 2021/0051499 | A1* | 2/2021 | Chen | H04W 80/08 |

(Continued)

FOREIGN PATENT DOCUMENTS

| | | |
|---|---|---|
| CN | 107787005 | 3/2018 |
| CN | 109644361 | 4/2019 |

(Continued)

OTHER PUBLICATIONS

Guangdong OPPO Mobile Telecom, "Remaining details on NR radio link monitoring," 3GPP TSG RAN WG1 Meeting NR#3, R1-1715679, Sep. 2017.

(Continued)

Primary Examiner — Anh Vu H Ly
(74) Attorney, Agent, or Firm — Hodgson Russ LLP (57) ABSTRACT

A method for link quality monitoring and related products are provided in implementations of the present disclosure. The method includes the following. A first radio link monitoring reference signal (RLM-RS) resource is obtained, where the first RLM-RS resource is a resource among M first RLM-RS candidate resources, and K first RLM-RS candidate resources among the M first RLM-RS candidate resources are used to transmit a first RLM-RS, M and K are positive integers, and $K \leq M$. Radio link quality monitoring is performed according to the first RLM-RS resource.

12 Claims, 3 Drawing Sheets

OBTAIN A FIRST RLM-RS RESOURCE, WHERE THE FIRST RLM-RS RESOURCE IS A RESOURCE AMONG $M$ FIRST RLM-RS CANDIDATE RESOURCES, AND $K$ FIRST RLM-RS CANDIDATE RESOURCES AMONG THE $M$ FIRST RLM-RS CANDIDATE RESOURCES ARE USED TO TRANSMIT A FIRST RLM-RS, $M$ AND $K$ ARE POSITIVE INTEGERS — S201

PERFORM RADIO LINK QUALITY MONITORING ACCORDING TO THE FIRST RLM-RS RESOURCE — S202

(56) References Cited

U.S. PATENT DOCUMENTS

2022/0077917 A1\* 3/2022 Nagaraja ................ H04B 7/088
2022/0132344 A1\* 4/2022 Zhou ....................... H04L 1/203
2022/0201519 A1\* 6/2022 Huang ................. H04W 24/08

FOREIGN PATENT DOCUMENTS

| WO | 2013051864 | 4/2013 |
| WO | 2017035718 | 3/2017 |
| WO | 2019097457 | 5/2019 |
| WO | 2019097475 | 5/2019 |

OTHER PUBLICATIONS

WIPO, International Search Report for PCT/CN2019/116890, Jul. 27, 2020.
Sony, "Enhancements to initial access procedures for NR-U,", 3GPP TSG RAN WG1 #98bis, R1-1910760, Oct. 2019.
Ericsson, "Further considerations on RLM for NR," 3GPP TSG-RAN WG4 Meeting NR ad-hoc #3, R4-1709782, Sep. 2017.
Intel Corporation, "Considerations of RLF/RLM for NR-u," 3GPP TSG-RAN WG2 meeting #106, R2-1906298 (Resubmission of R2-1904436), May 2019.
EPO, Extended European Search Report for EP Application No. 19951836.6, Oct. 19, 2022.
EPO, Communication for EP Application No. 19951836.6, Jul. 29, 2024.

\* cited by examiner

METHOD FOR LINK QUALITY MONITORING AND RELATED PRODUCTS

CROSS REFERENCE TO RELATED APPLICATION(S)

This application is a continuation of International Application No. PCT/CN2019/116890, filed on Nov. 8, 2019, the entire disclosure of which is incorporated herein by reference.

TECHNICAL FIELD

The present disclosure relates to the technical field of communication, and more particularly, to a method for link quality monitoring and related products.

BACKGROUND

An unlicensed spectrum is allocated by a country and region and available for communication of radio devices. The spectrum is generally considered as a shared spectrum. That is, communication devices in different communication systems may utilize the spectrum without applying to the government for dedicated spectrum grants, as long as the regulatory requirements made by the country or region for the spectrum are met.

On the unlicensed spectrum, since listen before talk (LBT) needs to be performed before a network device transmits a signal, a situation where the network device cannot transmit a radio link monitoring reference signal (RLM-RS) on a configured RLM-RS resource may occur. In this situation, when performing radio link monitoring (RLM), user equipment (UE) cannot determine whether poor downlink (DL) radio link quality on the RLM-RS resource is because the network device has not transmitted the RLM-RS or the real downlink radio link quality is poor. As such, the DL radio link quality cannot be effectively evaluated.

SUMMARY

In a first aspect of implementations of the present disclosure, a method for link quality monitoring is provided. The method is applicable to a terminal device and includes the following. A first radio link monitoring reference signal (RLM-RS) resource is obtained, where the first RLM-RS resource is a resource among M first RLM-RS candidate resources, and K first RLM-RS candidate resources among the M first RLM-RS candidate resources are used to transmit a first RLM-RS, M and K are positive integers, and K≤M. Radio link quality monitoring is performed according to the first RLM-RS resource.

In a second aspect of implementations of the present disclosure, a terminal device is provided. The terminal device includes a processor and a memory configured to store one or more programs. The processor is configured to invoke and execute the one or more programs stored in the memory to: obtain a first RLM-RS resource, where the first RLM-RS resource is a resource among M first RLM-RS candidate resources, and K first RLM-RS candidate resources among the M first RLM-RS candidate resources are used to transmit a first RLM-RS, M and K are positive integers, and K≤M, and perform radio link quality monitoring according to the first RLM-RS resource.

In a third aspect of implementations of the present disclosure, a computer-readable storage medium is provided. The computer-readable storage medium is configured to store computer programs for electronic data interchange. The computer programs are operable with a computer to perform the method in the first aspect.

BRIEF DESCRIPTION OF THE DRAWINGS

In order to more clearly illustrate technical solutions in implementations of the present disclosure, the following will briefly introduce drawings required for description of implementations. Obviously, the drawings in the following description illustrate some implementations of the present disclosure. For those of ordinary skill in the art, other drawings can be obtained from these drawings without creative work.

DETAILED DESCRIPTION

The terms used in implementation part of the present disclosure are only used to illustrate specific implementations of the present disclosure, but not intended to limit the present disclosure. The terms "first", "second", "third", and "fourth" in the specification, claims, and drawings of the present disclosure are used to distinguish different objects, but not to describe a specific order. In addition, the terms "including", "comprising", "having", and any variations thereof are intended to cover non-exclusive inclusions.

The terms used in implementation part of the present disclosure are only used to illustrate specific implementations of the present disclosure, but not intended to limit the present disclosure. The terms "first", "second", "third", and "fourth" in the specification, claims, and drawings of the present disclosure are used to distinguish different objects, but not to describe a specific order. In addition, the terms "including", "comprising", "having", and any variations thereof are intended to cover non-exclusive inclusions.

Implementations of the present disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations herein can also be applied to these communication systems.

Optionally, a communication system of implementations may be applied to a carrier aggregation (CA) scenario, a dual connectivity (DC) scenario, or a standalone (SA) network deployment scenario.

A spectrum applied is not limited in implementations of the present disclosure. For example, implementations of the present disclosure may be applicable to a licensed spectrum, and may also be applicable to an unlicensed spectrum.

Figure 1:
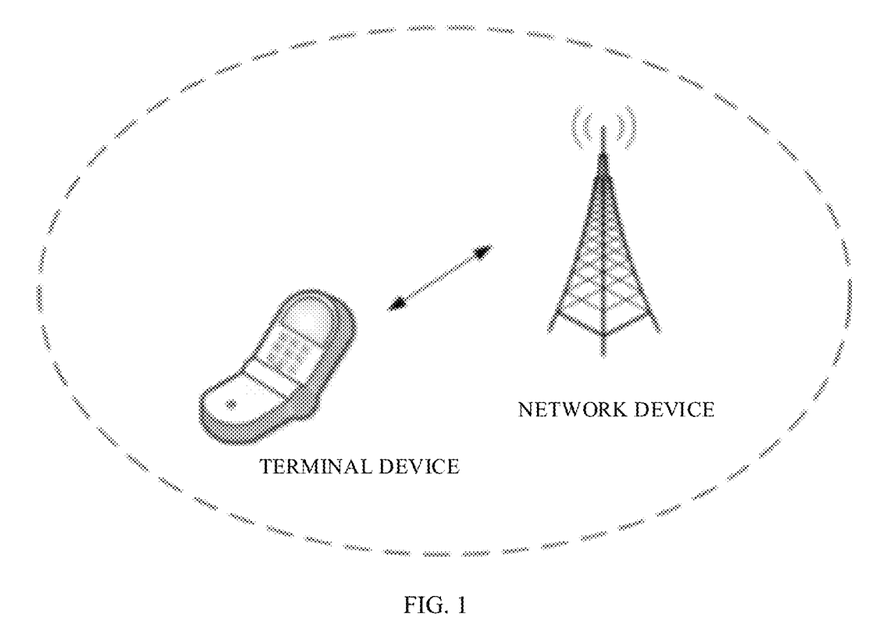
FIG. 1 is a schematic diagram of a communication system architecture provided in implementations of the present disclosure.

FIG. 1 is a schematic diagram of a communication system architecture provided in implementations of the present disclosure. The communication system includes a network device and a terminal device. As illustrated in FIG. 1, the network device can communicate with the terminal device. The communication system may be a 5th generation (5G) communication system, such as a new radio (NR) system, a communication system that integrates multiple communication technologies, such as a communication system that integrates LTE technologies and NR technologies, or a future evolved communication system. The form and the number of the network device and the terminal device illustrated in FIG. 1 are only for example, and do not constitute a limitation to implementations of the present disclosure.

The terminal device in the present disclosure is a device with a wireless communication function. The terminal device may be deployed on land, for example, deployed indoors or outdoors, and may be handheld, wearable, or vehicle-mounted. The UE may also be deployed on water, for example, on a ship, etc. The terminal device may also be deployed in the air, for example, on an airplane, an air balloon, a satellite, etc. The UE may be a mobile phone, a pad, a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in smart home, etc. The terminal device may also be a handheld device, a vehicle-mounted device, a wearable device, or a computer device with a wireless communication function, or another processing device connected to a wireless modem. In different networks, the terminal device may have different names, such as, terminal device, access terminal, user unit, user station, mobile station, remote station, remote terminal, mobile device, user terminal, terminal, wireless communication device, user agent, or user device, cellular phone, cordless phone, session initiation protocol (SIP) phone, wireless local loop (WLL) station, personal digital assistant (PDA), terminal device in a 5G network or a future evolved network, etc.

The network device in the present disclosure is a device deployed in a wireless access network to provide a wireless communication function. For example, the network device may be a radio access network (RAN) device on access network side in a cellular network. The so-called RAN device is a device configured to connect the terminal device to a wireless network, and includes but is not limited to: an evolved node B (eNB), a radio network controller (RNC), a node B (NB), a base station controller (BSC), a base transceiver station (BTS), a home base station, for example, a home evolved node B or a home node B (HNB), a base band unit (BBU), or a mobility management entity (MME). For another example, the network device may also be a node device in a wireless local area network (WLAN), such as an access controller (AC), a gateway, or a wireless fidelity (Wi-Fi) access point (AP). For another example, the network device may also be a transmission node or a transmission reception point (TRP or TP) in an NR system.

An unlicensed spectrum is allocated by a country and region and available for communication of radio devices. The spectrum is generally considered as a shared spectrum. That is, communication devices in different communication systems may utilize the spectrum without applying to the government for dedicated spectrum grants, as long as the regulatory requirements made by the country or region for the spectrum are met.

To enable various communication systems, which perform wireless communication by utilizing an unlicensed spectrum, to coexist on the unlicensed spectrum friendly, some countries or regions have made regulatory requirements that need to be satisfied during use of the unlicensed spectrum. For example, a communication device follows a listen before talk (LBT) rule. That is, the communication device needs to firstly perform channel listening, before transmitting a signal on a channel in an unlicensed spectrum, and the communication device can transmit a signal only if a channel listening result indicates that the channel is idle. If the channel listening result of the communication device for the channel in the unlicensed spectrum indicates that the channel is busy, the communication device may not transmit a signal. Moreover, to ensure fairness, during each time of transmission, a duration in which the communication device performs signal transmission using the channel in the unlicensed spectrum may not exceed a maximum channel occupancy time (MCOT).

Figure 2:
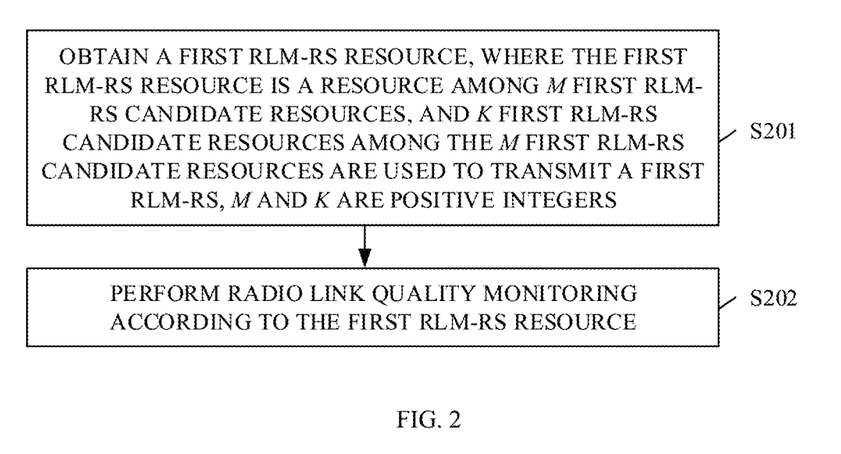
FIG. 2 is a schematic flowchart of a method for link quality monitoring provided in implementations of the present disclosure.

Referring to FIG. 2, FIG. 2 is a schematic flowchart of a method for link quality monitoring provided in implementations of the present disclosure. As illustrated in FIG. 2, the method for link quality monitoring is applicable to a terminal device and includes S201-S202, which are specifically as follows.

At S201, a first radio link monitoring reference signal (RLM-RS) resource is obtained, where the first RLM-RS resource is a resource among M first RLM-RS candidate resources, and K first RLM-RS candidate resources among the M first RLM-RS candidate resources are used to transmit a first RLM-RS, M and K are positive integers, and K≤M.

The first RLM-RS resource includes a synchronization signal block (SSB) (or referred to as "synchronization signal/PBCH block") resource and/or a channel state information reference signal (CSI-RS) resource.

The first RLM-RS candidate resource can be understood as a resource that can be used to transmit an RLM-RS. The first RLM-RS candidate resource can be used to transmit the RLM-RS, or can be in an idle state and not used to transmit the RLM-RS.

At S202, radio link quality monitoring is performed according to the first RLM-RS resource.

When the radio link quality monitoring is performed according to the first RLM-RS resource, in-sync (IS) evaluation or out-of-sync (OOS) evaluation may be performed.

When performing radio link quality detection, the terminal device is configured to perform downlink (DL) radio link monitoring on a primary cell (PCell) or a primary SCG cell (PSCell) in a case of DC, for example, to report an OOS/IS state indication to an upper layer.

In this example, the first RLM-RS resource is obtained, where the first RLM-RS resource is a resource among M first RLM-RS candidate resources, and K first RLM-RS candidate resources among the M first RLM-RS candidate resources are used to transmit a first RLM-RS, M and K are positive integers, and radio link quality monitoring is performed according to the first RLM-RS resource. As such, compared with an existing solution where it is difficult to accurately determine whether the poor radio link quality is because the real radio link quality is poor, after an exact RLM-RS resource is determined, link quality monitoring can be performed according to the RLM-RS resource, so the radio link quality monitoring can be performed more accurately.

In a possible implementation, the K first RLM-RS candidate resources among the M first RLM-RS candidate resources are used to transmit the first RLM-RS as follows.

If more than K or K first RLM-RS candidate resources among the M first RLM-RS candidate resources have a channel availability, K first RLM-RS candidate resources having the channel availability among the M first RLM-RS candidate resources are used to transmit the first RLM-RS. Alternatively, if less than K first RLM-RS candidate resources among the M first RLM-RS candidate resources have the channel availability, a first RLM-RS candidate resource having the channel availability among the M first RLM-RS candidate resources is used to transmit the first RLM-RS.

The terminal device may detect the M first RLM-RS candidate resources, and determine a first RLM-RS candidate resource where a first RLM-RS is transmitted among the M first RLM-RS candidate resources. For a specific detection method, reference may be made to a detection method in related art, which will not be repeated herein.

Optionally, when more than K or K first RLM-RS candidate resources obtain a channel availability, K first RLM-RS candidate resources may be selected to transmit an RLM-RS from the first RLM-RS candidate resources obtaining the channel availability. Alternatively, when less than K first RLM-RS candidate resources obtain the channel availability, all the first RLM-RS candidate resource(s) obtaining the channel availability is used to transmit the RLM-RS.

In a possible implementation, the terminal device determines K first RLM-RS candidate resources for radio link monitoring among the M first RLM-RS candidate resources as follows.

The terminal device detects the M first RLM-RS candidate resources, and determines a first RLM-RS candidate resource where a first RLM-RS is transmitted among the M first RLM-RS candidate resources. If the number of first RLM-RS candidate resources determined to have transmitted the first RLM-RS among the M first RLM-RS candidate resources is greater than K, K first RLM-RS candidate resources determined to have transmitted the first RLM-RS among the M first RLM-RS candidate resources are used for radio link monitoring. Alternatively, if the number of first RLM-RS candidate resources determined to have transmitted the first RLM-RS among the M first RLM-RS candidate resources is less than or equal to K, a first RLM-RS candidate resource determined to have transmitted the first RLM-RS among the M first RLM-RS candidate resources is used for radio link monitoring.

Optionally, when the terminal device determines that the first RLM-RS is transmitted on more than K first RLM-RS candidate resources, K first RLM-RS candidate resources may be selected for radio link monitoring from the first RLM-RS candidate resources where the first RLM-RS is transmitted. When the terminal device determines that the first RLM-RS is transmitted on less than K or K first RLM-RS candidate resources, all the first RLM-RS candidate resource(s) where the first RLM-RS is transmitted is used for radio link monitoring.

For a specific implementation manner in this implementation, reference may be made to a specific implementation manner in implementations above, which will not be repeated herein.

In a possible implementation, the first RLM-RS resource includes K first RLM-RS candidate resources with the best channel quality among the M first RLM-RS candidate resources.

The K first RLM-RS candidate resources with the best channel quality can be understood as K first RLM-RS candidate resources with the highest channel quality evaluation parameters. For example, K may be a positive integer.

The first RLM-RS resource includes the K first RLM-RS candidate resources with the best channel quality among the M first RLM-RS candidate resources, which can be understood as follows. Assuming that the terminal device is aware of positions of the M first candidate resources, channel quality of the positions of the M first candidate resources may be directly detected, and the K first RLM-RS candidate resources with the best channel quality may be determined as the first RLM-RS resource.

For example, assuming that there are five first RLM-RS candidate resources, for example, RLM-RS candidate resource 0, RLM-RS candidate resource 1, RLM-RS candidate resource 2, RLM-RS candidate resource 3, RLM-RS candidate resource 4, where a channel of RLM-RS candidate resource 0 has a signal-to-noise ratio (SNR) of 10 dB, a channel of RLM-RS candidate resource 1 has an SNR of 8 dB, a channel of RLM-RS candidate resource 2 has an SNR of 15 dB, a channel of RLM-RS candidate resource 3 has an SNR of 5 dB, and a channel of RLM-RS candidate resource 4 has an SNR of 20 dB. Then, three first RLM-RS candidate resources with the best channel quality (for example, the SNR of the channel is from high to low) among the five first RLM-RS candidate resources can be understood as RLM-RS candidate resource 4, RLM-RS candidate resource 2, and RLM-RS candidate resource 0. It should be noted that the above is just an example, and any method for determining the K first RLM-RS candidate resources with the best channel quality among the M first RLM-RS candidate resources based on the above example falls within the scope of the present disclosure, which will not be repeated herein.

In this example, since there are multiple first RLM-RS candidate resource positions, the terminal device may assume that the network device can always transmit the first RLM-RS through at least some of RLM-RS candidate resources at the multiple first RLM-RS candidate resource positions. Therefore, the terminal device may not detect an existence of the first RLM-RS, but directly select an RLM-RS candidate resource(s) with the best channel quality as the first RLM-RS resource according to the channel quality at the candidate resource positions, thereby improving efficiency in determining the first RLM-RS resource.

In a possible implementation, the first RLM-RS resource includes a first RLM-RS candidate resource which is determined by the terminal device for transmitting the first RLM-RS among the M first RLM-RS candidate resources.

The terminal device may determine the first RLM-RS candidate resource for transmitting the first RLM-RS as follows. The first RLM-RS candidate resource for transmitting the first RLM-RS may be determined according to a detection result of the first RLM-RS or other indication information.

In this example, when there is a high requirement for signal quality, the first RLM-RS candidate resource for transmitting the first RLM-RS may be determined by detecting an existence of the first RLM-RS in the first RLM-RS candidate resource. As such, the first RLM-RS can be directly detected, thereby improving accuracy in determining the first RLM-RS candidate resource.

In a possible implementation, the terminal device determines the first RLM-RS candidate resource for transmitting the first RLM-RS as follows. The terminal device determines the first RLM-RS candidate resource for transmitting the first RLM-RS according to a detection result of the first RLM-RS on the M first RLM-RS candidate resources, and/or the terminal device determines the first RLM-RS candidate resource for transmitting the first RLM-RS according to first information.

The detection result may include an existence detection result that whether there is a first RLM-RS. If there is a first RLM-RS, a first RLM-RS candidate resource corresponding to the first RLM-RS is determined as the first RLM-RS candidate resource for transmitting the first RLM-RS.

The first information includes at least one of: channel occupancy time (COT) indication information and detection information of a second RLM-RS.

In a possible implementation, the first RLM-RS resource includes K first RLM-RS candidate resources with the worst channel quality among the M first RLM-RS candidate resources.

The K first RLM-RS candidate resources with the worst channel quality can be understood as K first RLM-RS candidate resources with the lowest channel quality evaluation parameters.

In a possible implementation, the radio link quality monitoring can be performed according to the first RLM-RS resource as follows. In an IS evaluation period, whether DL radio link quality estimated on the first RLM-RS resource is higher than an IS threshold is evaluated.

The IS threshold $Q_{in}$ corresponds to a block error rate (BLER) value, and the BLER value corresponding to the IS threshold $Q_{in}$ can be obtained through a high-level parameter configured by the network, for example, rlmInSyncOutOfSyncThreshold. If the terminal device is not configured with a BLER value corresponding to the IS threshold $Q_{in}$ by the network device, the BLER value can be obtained through a preconfigured parameter. For example, the BLER value corresponding to the IS threshold $Q_{in}$ may be 2%.

When the DL radio link quality on at least one first RLM-RS resource is better than $Q_{in}$, the terminal device reports an IS indication to an upper layer, where layer 3 filtering needs to be performed on the IS indication reported.

Optionally, the IS evaluation period is an integer multiple of a period of a first discovery reference signal (DRS) transmission window.

During IS evaluation, the M RLM-RS candidate resources are in the first DRS transmission window.

In a possible implementation, the radio link quality monitoring can also be performed according to the first RLM-RS resource as follows.

In an OOS evaluation period, whether DL radio link quality estimated on the first RLM-RS resource is lower than an OOS threshold is determined.

The OOS threshold $Q_{out}$ corresponds to a BLER value, and the BLER value corresponding to the OOS threshold $Q_{out}$ can be obtained through a high-level parameter configured by the network, for example, rlmInSyncOutOfSyncThreshold. If the terminal device is not configured with a BLER value corresponding to the OOS threshold $Q_{out}$ by the network device, the BLER value can be obtained through a preconfigured parameter. For example, the BLER value corresponding to the OOS threshold $Q_{out}$ may be 10%.

When the DL radio link quality on each first RLM-RS resource is worse than the threshold $Q_{out}$, the terminal device reports an OOS indication to an upper layer, where layer 3 filtering needs to be performed on the OOS indication reported.

Optionally, the OOS evaluation period is an integer multiple of a period of a second DRS transmission window.

During OOS evaluation, the M RLM-RS candidate resources are in the second DRS transmission window.

In a possible implementation, a DRS transmission window may include the first DRS transmission window and the second DRS transmission window.

There may be multiple SSB candidate positions in the DRS transmission window, and each candidate position may be considered as an SSB candidate resource. The terminal device may determine a quasi-co-located (QCL) relationship between at least two SSB candidate positions among the multiple SSB candidate positions according to a Q value, and determine SSB reception according to the QCL relationship. When transmitting an SSB in the DRS transmission window, the network device may make multiple LBT attempts, and once an LBT succeeds, the network device can transmit the SSB at at least one candidate position, which is determined to obtain a channel availability according to the QCL relationship, among the multiple SSB candidate positions. Q may have a value range of {1, 2, 4, 8}, and of course, Q may take another value.

Specifically, the terminal device may assume that SSBs transmitted at SSB candidate positions in a same QCL relationship are in a same QCL relationship. In other words, if the network device transmits an SSB at SSB candidate positions in a same QCL relationship, the network device needs to use a same beam.

Optionally, SSB candidate positions with a same mod(A, Q) are in a same QCL relationship, where A is an index of an SSB candidate position or an index of an SSB, and mod is a modulo operation. Optionally, a Q value is indicated to the terminal device by the network device or is preset.

Figure 3:
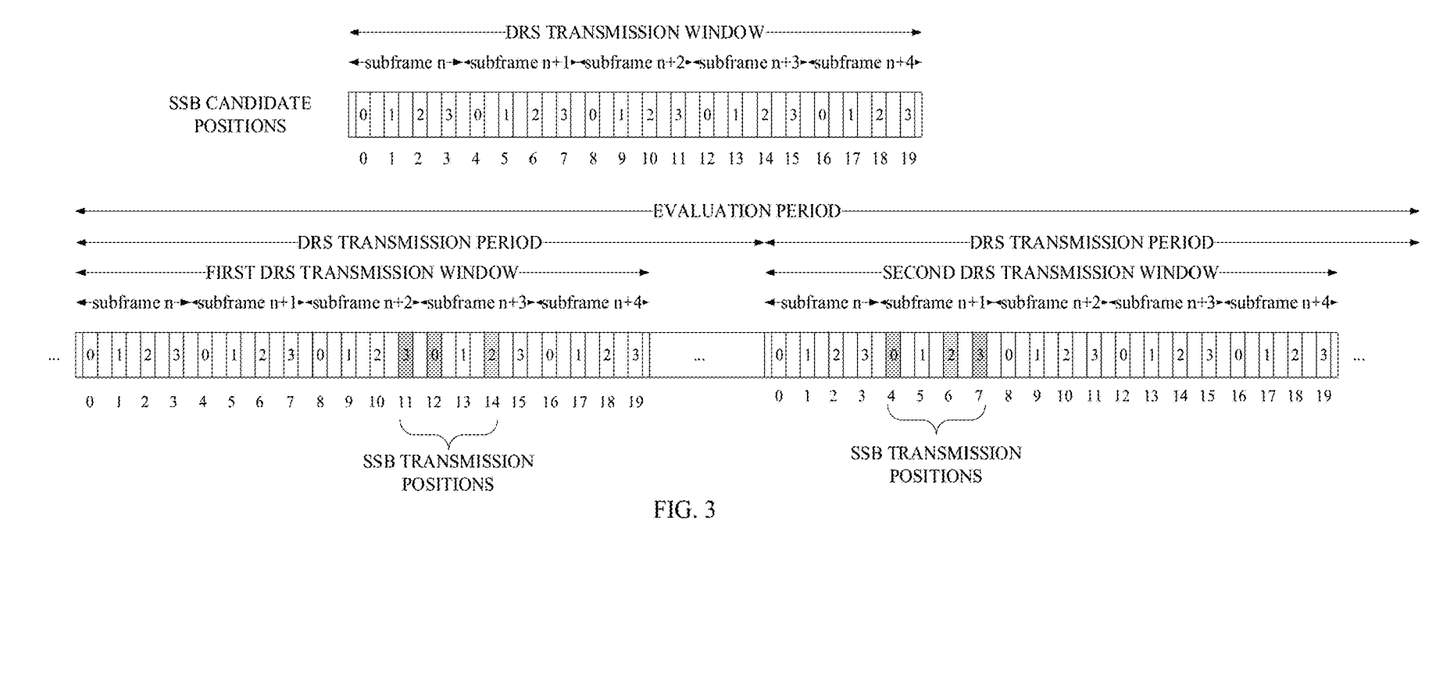
FIG. 3 is a schematic diagram of a discovery reference signal (DRS) transmission window provided in implementations of the present disclosure.

Referring to FIG. 3, FIG. 3 is a schematic diagram of a DRS transmission window provided in implementations of the present disclosure. As illustrated in FIG. 3, for illustrative purpose, the RLM-RS is for example an SSB, and n is an integer greater than or equal to 0. M and Q take a same value. As illustrated in FIG. 3, a set of SSB candidate positions in the DRS transmission window includes twenty SSB candidate positions, A ranges from 0 to 19, and Q takes a value of 4. The IS evaluation period is an integer multiple of the period of the first DRS transmission window, and the OOS evaluation period is an integer multiple of the period of the second DRS transmission window. An evaluation period in FIG. 3 may be an IS evaluation period or an OOS evaluation period.

The terminal device can determine a QCL relationship between the twenty SSB candidate positions according to the Q value as follows:

SSBs 0, 4, 8, 12, 16 are in a same QCL relationship;
SSBs 1, 5, 9, 13, 17 are in a same QCL relationship;
SSBs 2, 6, 10, 14, 18 are in a same QCL relationship; and
SSBs 3, 7, 11, 15, 19 are in a same QCL relationship.

For convenience of description, SSB candidate positions in a same QCL relationship are represented by a same number. In other words, an SSB can be transmitted through at least one of SSB candidate positions in a same QCL relationship. In different DRS transmission windows, the network device may select a candidate position obtaining a channel availability from SSB candidate positions in each DRS transmission window according to an LBT result for transmitting an SSB. For example, SSB #0 may be transmitted through at least one of candidate positions numbered 0 in FIG. 3, SSB #1 may be transmitted through at least one of candidate positions numbered 1 in FIG. 3, SSB #2 may be transmitted through at least one of candidate positions numbered 2 in FIG. 3, and SSB #3 may be transmitted through at least one of candidate positions numbered 3 in FIG. 3. In FIG. 3, SSBs actually transmitted by the network device are SSB #0, SSB #2, and SSB #3.

Assume that RLM-RSs configured for the terminal device for radio link monitoring (RLM) are SSB #2 and SSB #3. The IS evaluation period and the OOS evaluation period both include the first DRS transmission window and the second DRS transmission window.

When performing IS evaluation, the terminal device determines the first RLM-RS resource in the DRS transmission window according to at least one of the following situations. The first DRS transmission window is taken as an example herein, and the method is also applicable to the second DRS transmission window.

If the terminal device detects SSB #2 on SSB 14 in candidate positions corresponding to SSBs 2, 6, 10, 14, and 18 in the first DRS transmission window, the terminal device determines that the first RLM-RS resource includes SSB14.

If the terminal device detects no SSB #2 in the candidate positions corresponding to SSBs 2, 6, 10, 14, and 18 in the first DRS transmission window, the terminal device determines that the first RLM-RS resource does not include SSBs 2, 6, 10, 14, and 18 in the first DRS transmission window.

The terminal device performs measurement on the candidate positions of SSBs 2, 6, 10, 14, and 18 in the first DRS transmission window, and determines that the first RLM-RS resource corresponding to SSB #2 includes candidate positions with the best channel quality in measurement results at these candidate positions.

If the terminal device detects SSB #3 on SSB 11 in candidate positions of SSBs 3, 7, 11, 15, and 19 in the first DRS transmission window, the terminal device determines that the first RLM-RS resource includes SSB11.

If the terminal device detects no SSB #3 in the candidate positions corresponding to SSBs 3, 7, 11, 15, and 19 in the first DRS transmission window, the terminal device determines that the first RLM-RS resource does not include SSBs 3, 7, 11, 15, and 19 in the first DRS transmission window.

The terminal device performs measurement on the candidate positions of SSBs 3, 7, 11, 15, and 19 in the first DRS transmission window, and determines that the first RLM-RS resource corresponding to SSB #3 includes candidate positions with the best channel quality in measurement results at these candidate positions.

Further, the terminal device estimates DL radio link quality on the first RLM-RS resource and compares the DL radio link quality with a threshold $Q_{in}$, thereby performing RLM.

When performing OOS evaluation, the terminal device determines the first RLM-RS resource in the DRS transmission window according to at least one of the following situations. The first DRS transmission window is taken as an example herein, and the method is also applicable to the second DRS transmission window.

If the terminal device detects SSB #2 on SSB 14 in candidate positions corresponding to SSBs 2, 6, 10, 14, and 18 in the first DRS transmission window, the terminal device determines that the first RLM-RS resource includes SSB14.

The terminal device performs measurement on the candidate positions of SSBs 2, 6, 10, 14, and 18 in the first DRS transmission window, and determines that the first RLM-RS resource corresponding to SSB #2 includes candidate positions with the best channel quality in measurement results at these candidate positions.

If the terminal device detects no SSB #2 in the candidate positions corresponding to SSBs 2, 6, 10, 14, and 18 in the first DRS transmission window, the terminal device performs measurement on the candidate positions of SSBs 2, 6, 10, 14, and 18 in the first DRS transmission window, and determines that the first RLM-RS resource includes candidate positions with the best channel quality (or the worst channel quality) in measurement results at these candidate positions.

If the terminal device detects no SSB #2 in the candidate positions corresponding to SSBs 2, 6, 10, 14, and 18 in the first DRS transmission window, but the terminal device can determine that the network device transmits SSB #2 on SSB14 in the first DRS transmission window according to auxiliary information, for example, COT indication information or other indication information used for determining the SSB detection information, the terminal device determines that the first RLM-RS resource includes SSB14.

If the terminal device detects SSB #3 on SSB 11 in candidate positions of SSBs 3, 7, 11, 15, and 19 in the first DRS transmission window, the terminal device determines that the first RLM-RS resource includes SSB11.

The terminal device performs measurement on the candidate positions of SSBs 3, 7, 11, 15, and 19 in the first DRS transmission window, and determines that the first RLM-RS resource corresponding to SSB #3 includes candidate positions with the best channel quality in measurement results at these candidate positions.

If the terminal device detects no SSB #3 in the candidate positions corresponding to SSBs 3, 7, 11, 15, and 19 in the first DRS transmission window, the terminal device performs measurement on the candidate positions of SSBs 3, 7, 11, 15, and 19 in the first DRS transmission window, and determines that the first RLM-RS resource includes candidate positions with the best channel quality (or the worst channel quality) in measurement results at these candidate positions.

If the terminal device detects no SSB #3 in the candidate positions corresponding to SSBs 3, 7, 11, 15, and 19 in the first DRS transmission window, but the terminal device can determine that the network device transmits SSB #3 on SSB 11 in the first DRS transmission window according to auxiliary information, for example, COT indication information or other indication information used for determining the SSB detection information, the terminal device determines that the first RLM-RS resource includes SSB11.

Figure 4:
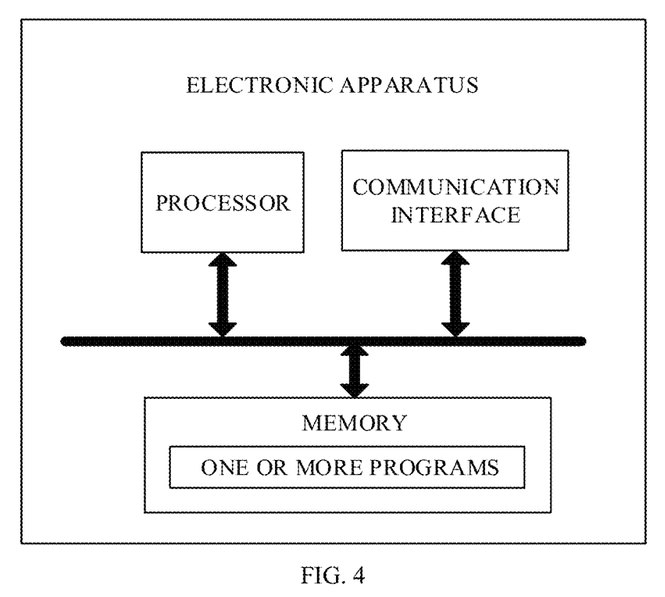
FIG. 4 is a schematic structural diagram of an electronic apparatus provided in implementations of the present disclosure.

Consistent with above implementations, referring to FIG. 4, FIG. 4 is a schematic structural diagram of an electronic apparatus provided in implementations of the present disclosure. As illustrated in FIG. 4, the electronic apparatus includes a processor, a memory configured to store one or more programs, and a communication interface. The one or more programs are configured to be executed by the processor and include instructions configured to perform the following operations.

A first RLM-RS resource is obtained, where the first RLM-RS resource is a resource among M first RLM-RS candidate resources, and K first RLM-RS candidate resources among the M first RLM-RS candidate resources are used to transmit a first RLM-RS, M and K are positive integers.

Radio link quality monitoring is performed according to the first RLM-RS resource.

Figure 5:
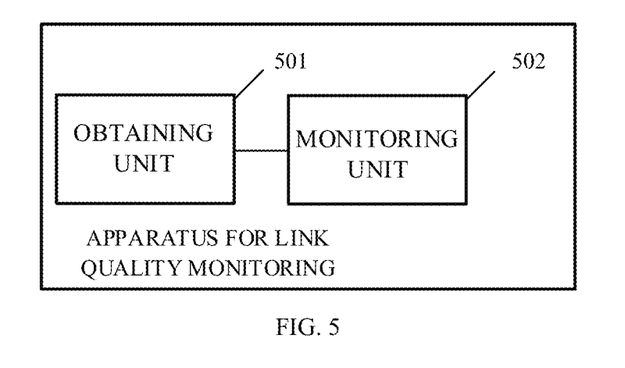
FIG. 5 is a schematic structural diagram of an apparatus for link quality monitoring provided in implementations of the present disclosure.

Consistent with the above, referring to FIG. 5, FIG. 5 is a schematic structural diagram of an apparatus for link quality monitoring provided in implementations of the present disclosure. As illustrated in FIG. 5, the apparatus is applicable to a terminal device and includes an obtaining unit 501 and a monitoring unit 502. The obtaining unit 501 is configured to obtain a first RLM-RS resource, where the first RLM-RS resource is a resource among M first RLM-RS candidate resources, and K first RLM-RS candidate resources among the M first RLM-RS candidate resources are used to transmit a first RLM-RS, M and K are positive integers. The monitoring unit 502 is configured to perform radio link quality monitoring according to the first RLM-RS resource.

In a possible implementation, the K first RLM-RS candidate resources among the M first RLM-RS candidate resources are used to transmit the first RLM-RS as follows. If more than K or K first RLM-RS candidate resources among the M first RLM-RS candidate resources have a channel availability, K first RLM-RS candidate resources having the channel availability among the M first RLM-RS candidate resources are used to transmit the first RLM-RS. Alternatively, if less than K first RLM-RS candidate resources among the M first RLM-RS candidate resources have the channel availability, a first RLM-RS candidate resource having the channel availability among the M first RLM-RS candidate resources is used to transmit the first RLM-RS.

In a possible implementation, the first RLM-RS resource includes K first RLM-RS candidate resources with the best channel quality among the M first RLM-RS candidate resources.

In a possible implementation, the first RLM-RS resource includes a first RLM-RS candidate resource which is determined by the terminal device for transmitting the first RLM-RS among the M first RLM-RS candidate resources.

In a possible implementation, the terminal device determines the first RLM-RS candidate resource for transmitting the first RLM-RS as follows. The terminal device determines the first RLM-RS candidate resource for transmitting the first RLM-RS according to a detection result of the first RLM-RS on the M first RLM-RS candidate resources, and/or the terminal device determines the first RLM-RS candidate resource for transmitting the first RLM-RS according to first information.

In a possible implementation, the first information includes at least one of: COT indication information and detection information of a second RLM-RS.

In a possible implementation, the first RLM-RS resource includes K first RLM-RS candidate resources with the worst channel quality among the M first RLM-RS candidate resources.

In a possible implementation, the device is further configured to: determine, by the terminal device, that none of the M first RLM-RS candidate resources is for transmitting the first RLM-RS, according to a detection result of the first RLM-RS on the M first RLM-RS candidate resources.

In a possible implementation, the monitoring unit 502 is specifically configured to: evaluate, in an IS evaluation period, whether DL radio link quality estimated on the first RLM-RS resource is higher than an IS threshold.

In a possible implementation, the M RLM-RS candidate resources are in a first DRS transmission window.

In a possible implementation, the IS evaluation period is an integer multiple of a period of the first DRS transmission window.

In a possible implementation, the monitoring unit 502 is specifically configured to: determine, in an OOS evaluation period, whether DL radio link quality estimated on the first RLM-RS resource is lower than an OOS threshold.

In a possible implementation, the M RLM-RS candidate resources are in a second DRS transmission window.

In a possible implementation, the OOS evaluation period is an integer multiple of a period of the second DRS transmission window.

In a possible implementation, the first RLM-RS resource comprises an SSB resource and/or a CSI-RS resource.

A computer storage medium is also provided in implementations of the present disclosure. The computer storage medium is configured to store computer programs for electronic data interchange. The computer programs are operable with a computer to perform some or all of the operations of any method for link quality monitoring described in method implementations.

A computer program product is also provided in implementations of the present disclosure. The computer program product includes a non-transitory computer-readable storage medium configured to store computer programs. The computer programs are operable with a computer to perform some or all of the operations of any method for link quality monitoring described in method implementations.

It should be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In implementations provided in the present disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), disk or compact disc (CD), and so on.

Implementations of the present disclosure are described in detail above, and specific examples are used herein to illustrate principles and implementations of the present disclosure. The illustration of implementations above are only used to help understand the methods and core ideas of the present disclosure. At the same time, for those of ordinary skill in the art, based on the ideas of the present disclosure, there may be changes in the specific implementations and scope of the present disclosure. In conclusion, the content of this specification should not be construed as a limitation to the present disclosure.

What is claimed is:

1. A method for link quality monitoring, being applicable to a terminal device and comprising:
   obtaining a first radio link monitoring reference signal (RLM-RS) resource, wherein the first RLM-RS resource is a resource among M first RLM-RS candidate resources, and K first RLM-RS candidate resources among the M first RLM-RS candidate resources are used to transmit a first RLM-RS, M and K are positive integers, and K≤M;
   performing radio link quality monitoring according to the first RLM-RS resource, wherein the first RLM-RS resource comprises K first RLM-RS candidate resources with worst channel quality among the M first RLM-RS candidate resources; and
   determining that none of the M first RLM-RS candidate resources is for transmitting the first RLM-RS, according to a detection result of the first RLM-RS on the M first RLM-RS candidate resources.

2. The method of claim 1, wherein the K first RLM-RS candidate resources among the M first RLM-RS candidate resources being used to transmit the first RLM-RS comprising:
   if more than K or K first RLM-RS candidate resources among the M first RLM-RS candidate resources have a channel availability, K first RLM-RS candidate resources having the channel availability among the M first RLM-RS candidate resources are used to transmit the first RLM-RS; or
   if less than K first RLM-RS candidate resources among the M first RLM-RS candidate resources have the channel availability, a first RLM-RS candidate resource having the channel availability among the M first RLM-RS candidate resources is used to transmit the first RLM-RS.

3. The method of claim 1, wherein performing the radio link quality monitoring according to the first RLM-RS resource comprises:
   evaluating, in an in-sync (IS) evaluation period, whether downlink (DL) radio link quality estimated on the first RLM-RS resource is higher than an IS threshold.

4. The method of claim 3, wherein the M RLM-RS candidate resources are in a first discovery reference signal (DRS) transmission window.

5. The method of claim 4, wherein the IS evaluation period is an integer multiple of a period of the first DRS transmission window.

6. The method of claim 1, wherein performing the radio link quality monitoring according to the first RLM-RS resource comprises:
   determining, in an out-of-sync (OOS) evaluation period, whether DL radio link quality estimated on the first RLM-RS resource is lower than an OOS threshold.

7. The method of claim 6, wherein the M RLM-RS candidate resources are in a second DRS transmission window.

8. The method of claim 7, wherein the OOS evaluation period is an integer multiple of a period of the second DRS transmission window.

9. The method of claim 1, wherein the first RLM-RS resource comprises a synchronization signal block (SSB) resource and/or a channel state information reference signal (CSI-RS) resource.

10. A terminal device, comprising:
    a processor; and
    a memory configured to store one or more programs;
    wherein the processor is configured to execute the one or more programs stored in the memory to:
      obtain a first radio link monitoring reference signal (RLM-RS) resource, wherein the first RLM-RS resource is a resource among M first RLM-RS candidate resources, and K first RLM-RS candidate resources among the M first RLM-RS candidate resources are used to transmit a first RLM-RS, M and K are positive integers, and K≤M;
      perform radio link quality monitoring according to the first RLM-RS resource, wherein the first RLM-RS resource comprises K first RLM-RS candidate resources with worst channel quality among the M first RLM-RS candidate resources; and
      determine that none of the M first RLM-RS candidate resources is for transmitting the first RLM-RS, according to a detection result of the first RLM-RS on the M first RLM-RS candidate resources.

11. The terminal device of claim 10, wherein the K first RLM-RS candidate resources among the M first RLM-RS candidate resources being used to transmit the first RLM-RS comprising:
    if more than K or K first RLM-RS candidate resources among the M first RLM-RS candidate resources have a channel availability, K first RLM-RS candidate resources having the channel availability among the M first RLM-RS candidate resources are used to transmit the first RLM-RS; or if less than K first RLM-RS candidate resources among the M first RLM-RS candidate resources have the channel availability, a first RLM-RS candidate resource having the channel availability among the M first RLM-RS candidate resources is used to transmit the first RLM-RS.

12. A non-transitory computer-readable storage medium configured to store computer programs for electronic data interchange, the computer programs being operable with a computer to perform the method of claim 1.

* * * * *